US012569976B2

(12) United States Patent
Chang

(10) Patent No.: US 12,569,976 B2
(45) Date of Patent: Mar. 10, 2026

(54) TOOL HANGER

(71) Applicant: Chih-Min Chang, Xiushui Township (TW)

(72) Inventor: Chih-Min Chang, Xiushui Township (TW)

( * ) Notice: Subject to any disclaimer, the term of this patent is extended or adjusted under 35 U.S.C. 154(b) by 0 days.

(21) Appl. No.: 18/654,720

(22) Filed: May 3, 2024

(65) Prior Publication Data

US 2025/0249570 A1 Aug. 7, 2025

(30) Foreign Application Priority Data

Feb. 2, 2024 (TW) ................................ 113201289

(51) Int. Cl.
*B25H 3/04* (2006.01)

(52) U.S. Cl.
CPC ..................................... *B25H 3/04* (2013.01)

(58) Field of Classification Search
CPC .................................. B25H 3/04; B25H 3/003
USPC ........ 211/13.1, 70.6, 69; 206/376, 372, 377; 248/496, 477
See application file for complete search history.

(56) References Cited

U.S. PATENT DOCUMENTS 3,370,696 A * 2/1968 Groe ....................... B25B 13/56 211/70.6
4,871,140 A * 10/1989 Hoskinson ............. A47G 1/162 248/216.1
5,054,638 A * 10/1991 Rose .................. A47G 23/0266 220/759
5,730,303 A * 3/1998 Chow ...................... B25H 3/04 206/372
5,967,340 A * 10/1999 Kao ......................... B25H 3/04 294/146
6,079,559 A * 6/2000 Lee ....................... A47F 5/0006 206/443
6,126,004 A * 10/2000 Ling ........................ B25H 3/04 206/378
6,401,923 B1 * 6/2002 Huang ..................... B25H 3/04 206/480
6,520,328 B2 * 2/2003 Ortiz .................. B65D 73/0085 206/352
6,536,611 B2 * 3/2003 Chen ..................... A47F 7/0028 211/70.6
6,758,350 B2 * 7/2004 Lin .......................... B25H 3/04 294/169
6,945,442 B2 * 9/2005 Godshaw ................. A45C 3/00 190/110

(Continued)

FOREIGN PATENT DOCUMENTS

DE 202024102034 U1 * 8/2024 ............... B25H 3/04
JP 3247175 U * 6/2024 ............... B25H 3/04

*Primary Examiner* — Jennifer E. Novosad
(74) *Attorney, Agent, or Firm* — MUNCY, GEISSLER, OLDS & LOWE, P.C.

(57) ABSTRACT

A tool hanger includes a main body having an upper portion and a lower portion opposite to the upper portion. The upper portion of the main body is provided with a hanging hole having a top wall and a plurality of positioning grooves located on the top wall and for engaging with a hook. The lower portion of the main body is provided with a tool hanging part for hanging at least one tool. As such, when a user horizontally moves the tool hanger, the hook is positionable in any one of the positioning grooves, allowing the tool hanger to be easily horizontally moved and stably positioned.

3 Claims, 6 Drawing Sheets

(56) References Cited

U.S. PATENT DOCUMENTS

| | | | | |
|---|---|---|---|---|
| 7,055,689 | B2 * | 6/2006 | Chen | B25H 3/04 206/349 |
| 7,210,663 | B2 * | 5/2007 | Wheeler | B65D 73/0064 206/349 |
| 7,441,741 | B2 * | 10/2008 | Wong | A47G 1/1626 248/467 |
| 7,584,845 | B2 * | 9/2009 | Cheng | B25H 3/04 206/372 |
| 7,815,058 | B2 * | 10/2010 | Cheng | B25H 3/04 206/349 |
| 8,376,153 | B1 * | 2/2013 | Lee | B25H 3/003 211/70.6 |
| 8,403,155 | B1 * | 3/2013 | Kao | B25H 3/04 211/70.6 |
| 8,556,075 | B1 * | 10/2013 | Ou | B65D 73/0064 206/378 |
| 8,573,413 | B2 * | 11/2013 | Sh | B25H 3/04 211/70.6 |
| 9,610,681 | B1 * | 4/2017 | Ou | B25H 3/04 |
| 11,065,758 | B2 * | 7/2021 | Hyma | B25H 3/02 |
| 2005/0247587 | A1 * | 11/2005 | Holland-Letz | B25H 3/003 206/349 |
| 2006/0108300 | A1 * | 5/2006 | Lin | A47F 7/0028 211/70.6 |
| 2006/0118500 | A1 * | 6/2006 | Chen | A47F 7/0028 211/70.6 |
| 2009/0095568 | A1 * | 4/2009 | Webster | E06C 7/14 248/210 |
| 2013/0043201 | A1 * | 2/2013 | Wang | B25H 3/003 211/70.6 |

* cited by examiner

TOOL HANGER

FIELD OF THE INVENTION

The present disclosure relates to a tool hanger and more particularly, to a tool hanger capable of being moved horizontally and positioned.

BACKGROUND OF THE INVENTION

A conventional tool hanger is equipped with two spaced hanging holes for engaging with two hooks fixed on a wall, allowing the tool hanger to be stably hung on the wall.

When a user wants to move the tool hanger horizontally to change the horizontal fixed position, since only one of the two hanging holes can be hooked onto one of the two hooks, the tool hanger cannot be hung on the wall in a horizontal position. In order to successfully change the horizontal fixed position of the tool hanger, the user has to place additional two hooks on the wall in a desired horizontal position, then takes the tool hanger off the original two hooks and hang the tool hanger on the aforesaid another two hooks. This is very inconvenient for the user. Therefore, improvements are needed.

SUMMARY OF THE INVENTION

Accordingly, it is an objective of the present disclosure to provide a tool hanger that can be easily moved horizontally and stably positioned.

To achieve the foregoing objective, a tool hanger provided in the present disclosure includes a main body having an upper portion and a lower portion opposite to the upper portion. The upper portion of the main body is provided with a hanging hole having a top wall and a plurality of positioning grooves located on the top wall for engaging with at least one hook. The lower portion of the main body is provided with a tool hanging part for hanging at least one tool.

Based on the above-mentioned technical features, the positioning grooves on the top wall of the hanging hole can still engage with the hook on the wall while the tool hanger is moved horizontally. Therefore, when a user wants to change the horizontal fixed position of the tool hanger, the user only needs to move the tool hanger horizontally instead of removing the tool hanger from the hook on the wall or adding extra hooks to the wall. As a result, the tool hanger of the present disclosure can be easily moved horizontally and stably positioned on the hook.

Preferably, the hanging hole has a bottom wall opposite to the top wall and a slot extending horizontally between the top wall and the bottom wall. Each positioning groove is recessed inward from the top wall and communicates with the slot.

Preferably, each positioning groove is continuously arranged along the extension direction of the slot.

Preferably, each positioning groove has an arc-shaped abutting surface.

Preferably, the upper portion of the main body is further provided with a flange surrounding the hanging hole to increase the structural strength of the hanging hole.

Preferably, the upper portion of the main body has a hanging portion and a hollow portion located below the hanging portion. The hanging portion includes a top plate, a partition arranged between the top plate and the hollow portion, and a connecting plate connecting the top plate and the partition. The top plate and the partition together define a grip portion, and the hanging hole penetrates through the connecting plate. Thus, a user's hand can reach into the hollow portion to grip the grip portion to move the tool hanger of the present disclosure.

The detailed construction, technical features, assembly, or usage of the tool hanger provided by the present disclosure will be described in the detailed description of the subsequent embodiments. However, it should be understood that the detailed description and specific embodiments of the present disclosure, are given by way of illustration only and not by way of limitation, since various changes and modifications within the spirit and scope of the present disclosure will become apparent to those skilled in the art from this detailed description.

BRIEF DESCRIPTION OF DRAWINGS

The tool hanger of the present disclosure is further described with reference to the accompany drawings as follows.

DETAILED DESCRIPTION OF THE INVENTION

It should be noted that the technical features of the present disclosure are not limited to the specific constructions, usages and applications set forth in the embodiments. The wording and terminology used in the description are illustrative and understandable to those skilled in the art. The expression such as "front", "back", "up", "down", "left", "right", "top", "bottom", "inner" or "outer" used to describe directions are also illustrative and are determined by standing facing the tool hanger in a direction of normal use.

Figure 1:
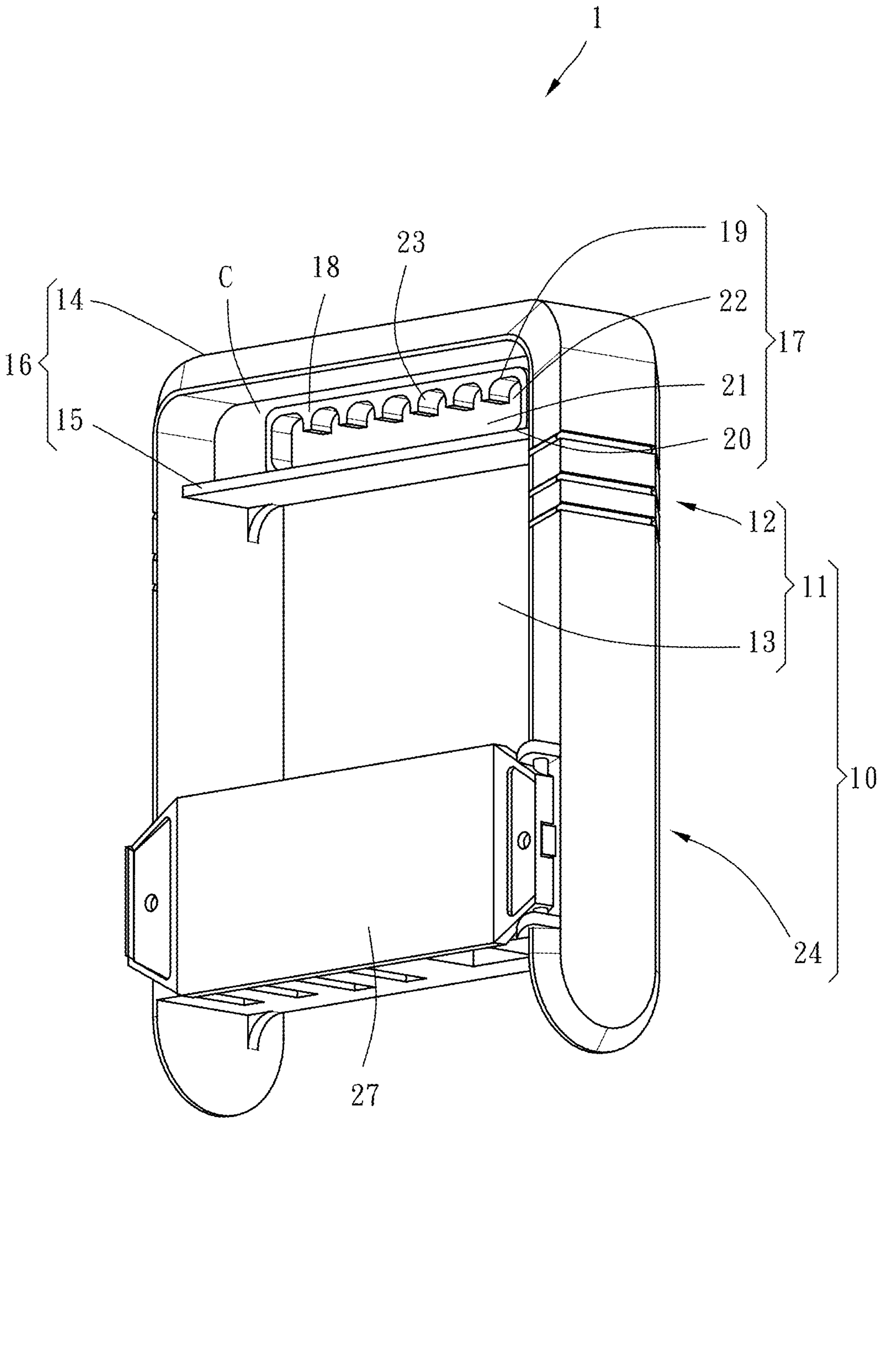
FIG. 1 is a perspective view of a tool hanger of the present disclosure.
Figure 2:
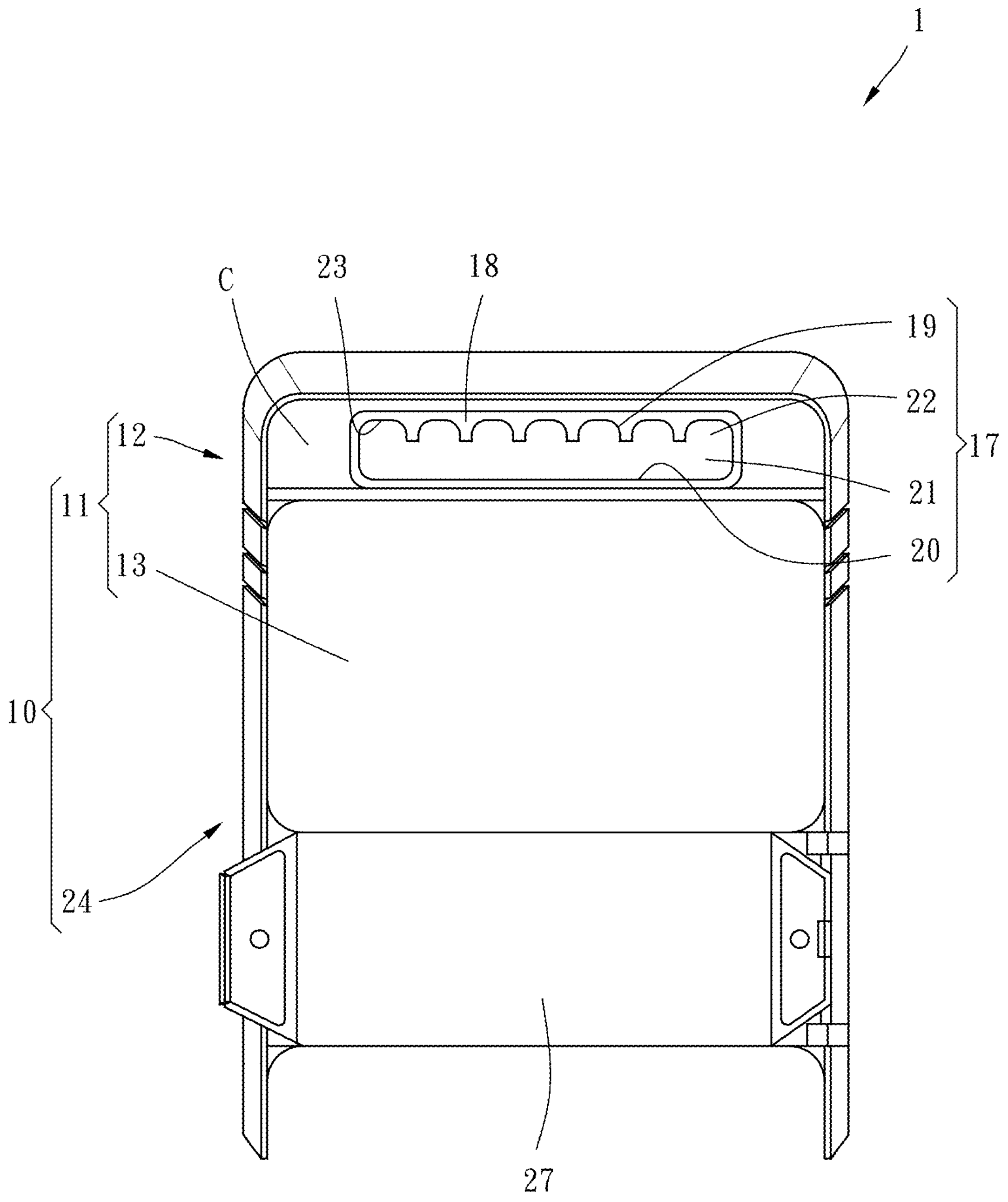
FIG. 2 is a front view of the tool hanger of the present disclosure.

Referring to FIGS. 1 and 2, a tool hanger 1 provided in one embodiment of the present disclosure comprises a main body 10.

The main body 10 includes an upper portion 11 having a hanging portion 12 and a hollow portion 13 located below the hanging portion 12. The hanging portion 12 has a top plate 14, a partition 15 arranged between the top plate 14 and the hollow portion 13, and a grip portion 16 defined by the top plate 14 and the partition 15. The hanging portion 12 further includes a connecting plate C connected between the top plate 14 and the partition 15, a hanging hole 17 penetrating through the connecting plate C, and a flange 18 surrounding the hanging hole 17, which is provided to increase the structural strength of the hanging hole 17. The hanging hole 17 has a top wall 19, a bottom wall 20 opposite to the top wall 19, a slot 21 extending horizontally between the top wall 19 and the bottom wall 20, and a plurality of positioning grooves 22 communicating with the slot 21 and continuously arranged along the extension direction of the slot 21. The number of the positioning grooves 22 is seven in this embodiment, but is not limited thereto. Each positioning groove 22 is recessed inward from the top wall 19 and has an arc-shaped abutting surface 23.

Figure 3:
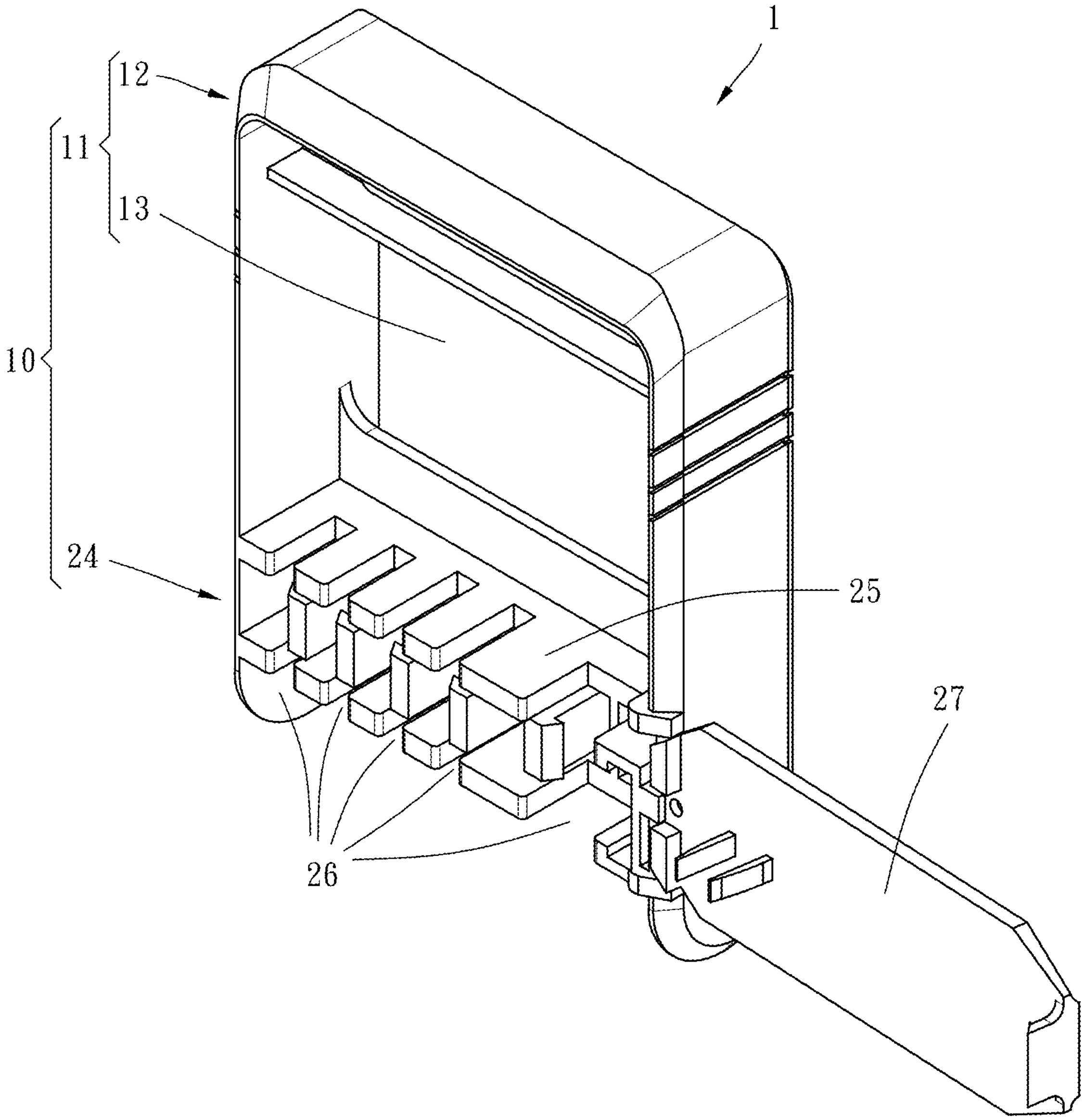
FIG. 3 is another perspective view of the tool hanger of the present disclosure, showing that the cover is opened outward.

As shown in FIG. 3, the main body 10 further includes a lower portion 24 opposite to the upper portion 11. The lower portion 24 of the main body 10 has a tool hanging part 25 located below the hollow portion 13 and equipped with five fixing grooves 26 for hanging at least one tool, such as a screwdriver, a wrench, a plier, etc.

In addition, the tool hanger 1 of the present disclosure further includes a cover 27 having one end pivotally mounted on one side of the lower portion 24 of the main body 10. When the cover 27 is closed, the fixing grooves 26 of the tool hanging part 25 can be shielded by the cover 27 to prevent the tool from slipping out of the fixing grooves 26.

Figure 4:
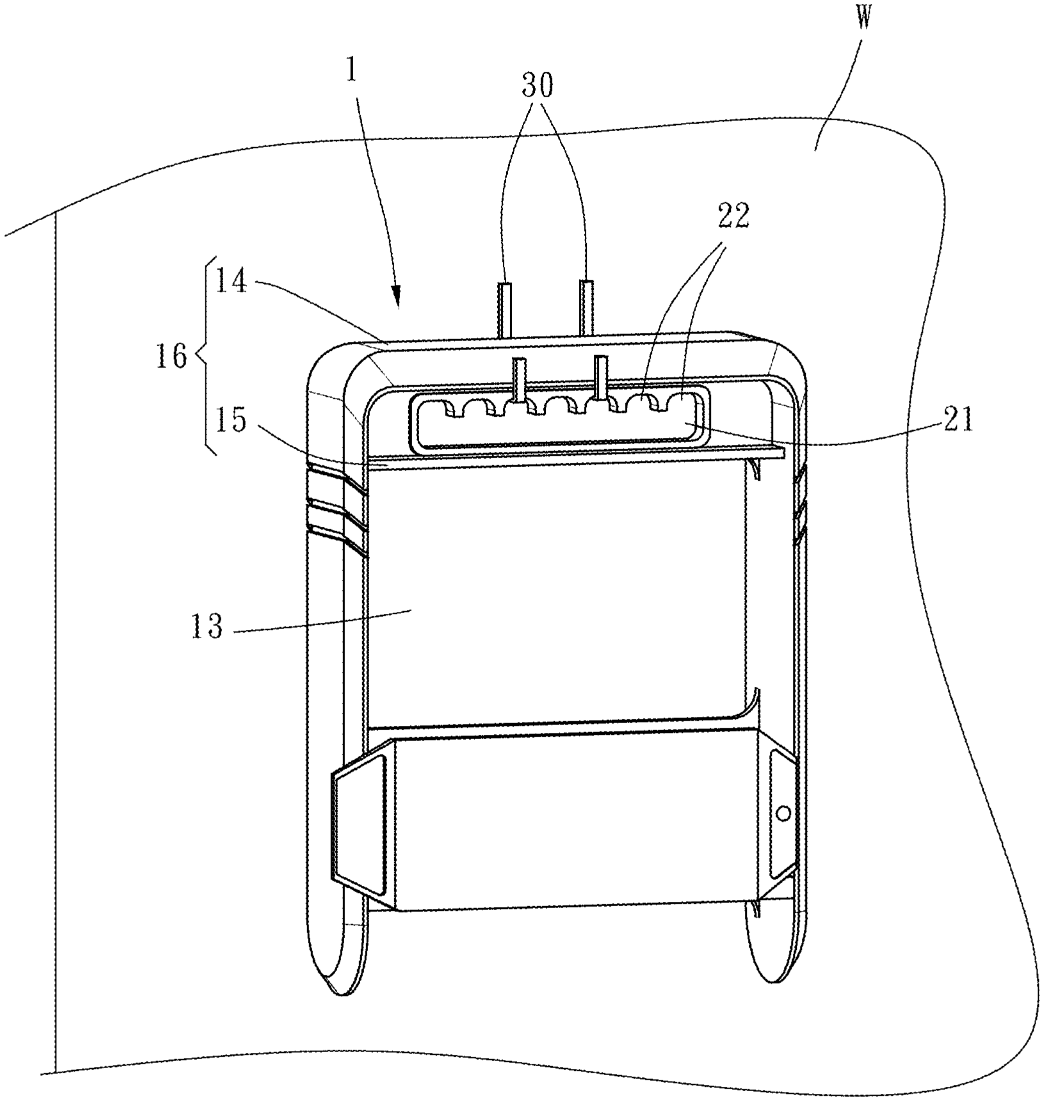
FIG. 4 is a schematic view, showing that the hanging hole of the tool hanger of the present disclosure is engaged with two hooks fixed on a wall.

As shown in FIG. 4, when the tool hanger 1 of the present disclosure is in actual use, it can be hung on two hooks 30 fixed on the wall W through the slot 21 and the two hooks 30 can be positioned in any two of the positioning grooves 22.

Figure 5:
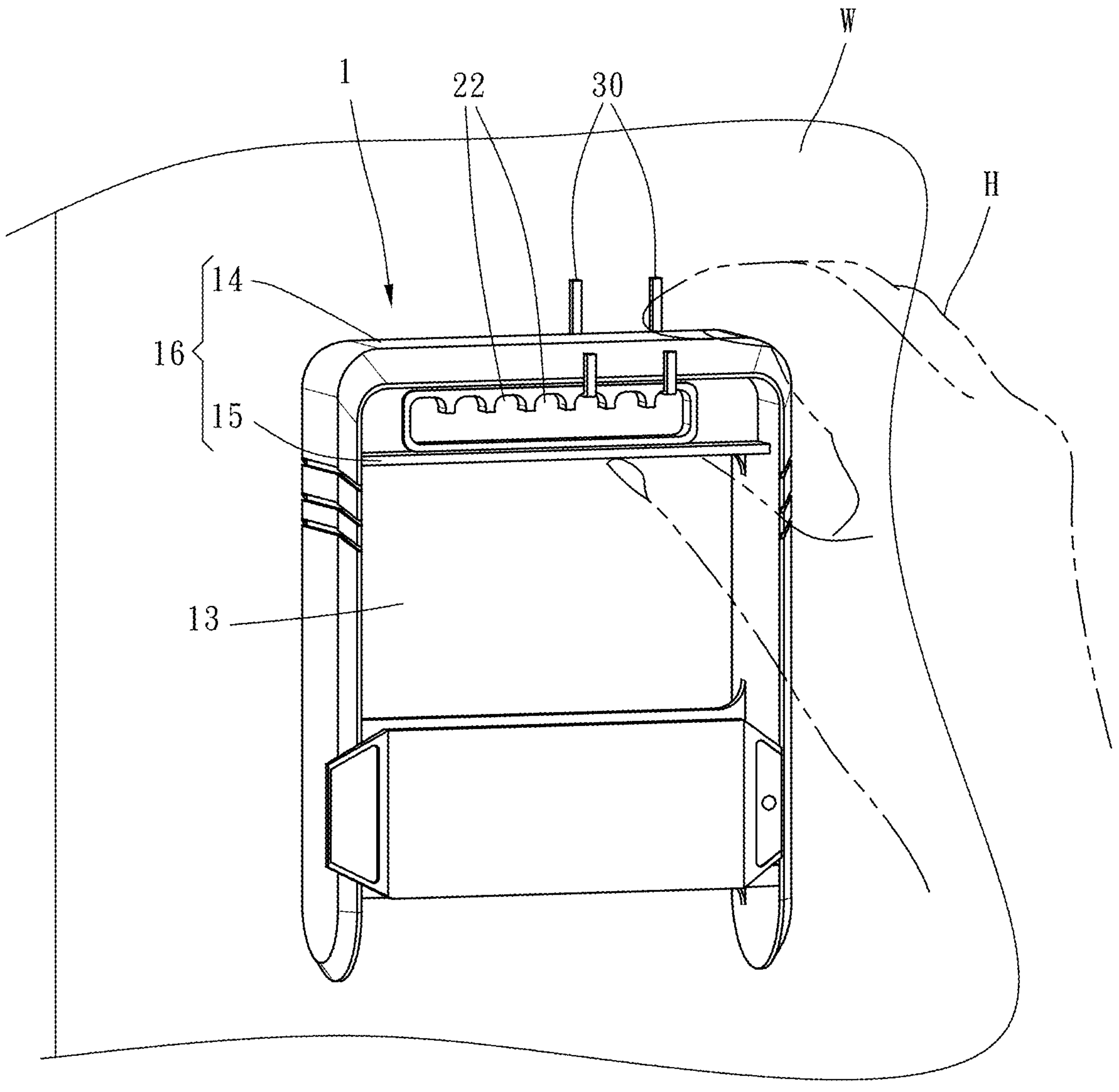
FIG. 5 is similar to FIG. 4, showing that the tool hanger of the present disclosure is moved horizontally to the left.
Figure 6:
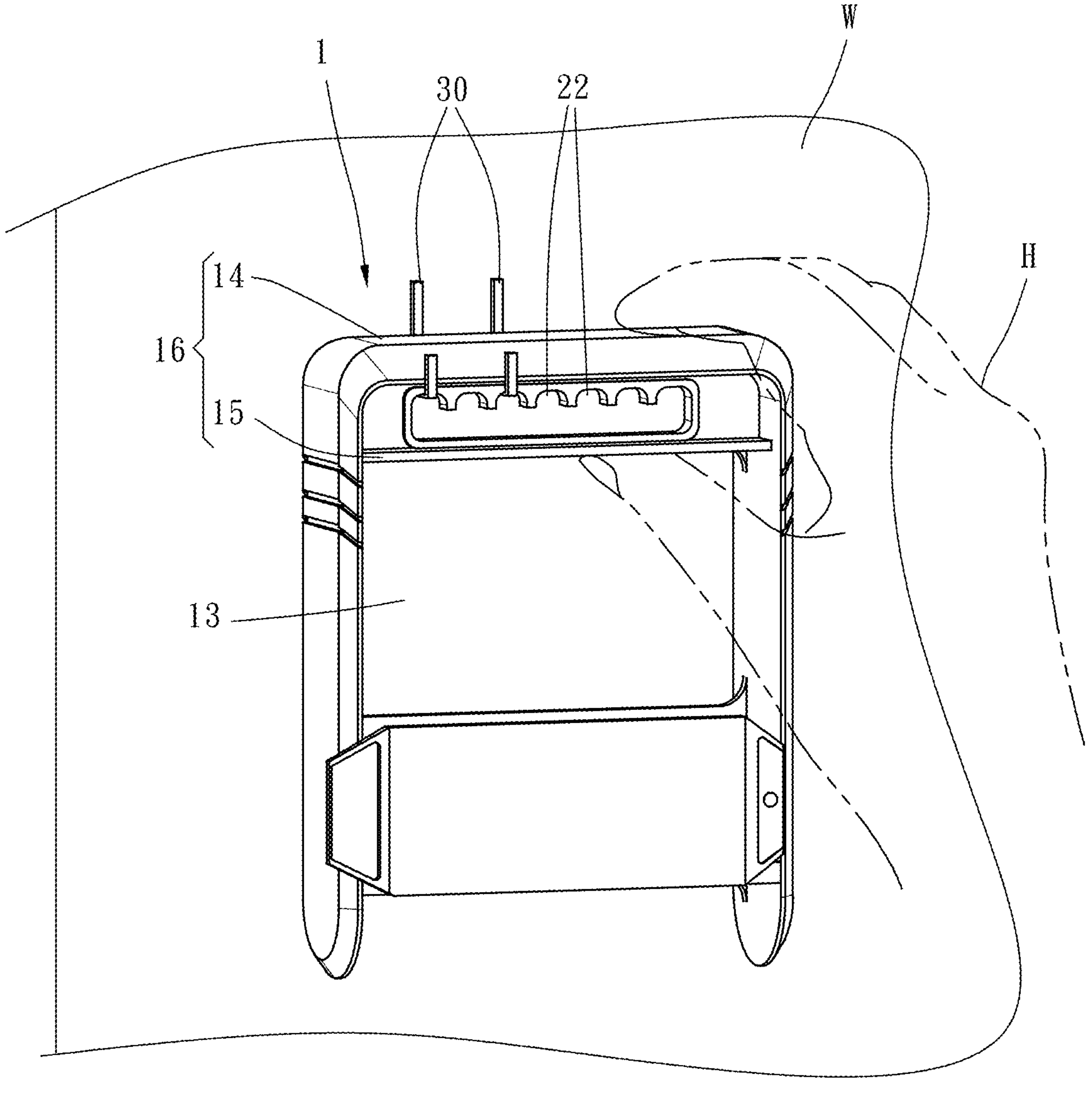
FIG. 6 is similar to FIG. 5, showing that the tool hanger of the present disclosure is moved horizontally to the right.

When a user wants to change the horizontal fixed position of the tool hanger 1, as shown in FIGS. 5 and 6, the user's fingers H can reach into the hollow portion 13 and grasp the grip portion 16 to release the two positioning grooves 22 originally engaged with the two hooks 30 from the two hooks 30 by moving the tool hanger 1 slightly upward. Then, the user simply needs to move the tool hanger 1 horizontally to the left (refer to FIG. 5) or to the right (refer to FIG. 6) so that any two of the positioning grooves 22 correspond to the two hooks 30, and then release the tool hanger 11 to allow the two positioning grooves 22 to engage stably with the two hooks 30. In this way, the user can easily change the horizontal position of the tool hanger 1, and the tool hanger 1 can be hung stably on the wall W without tilting.

In conclusion, because the tool hanger 1 of the present disclosure includes the hanging hole 17 equipped with a plurality of positioning grooves 22, when the user horizontally moves the tool hanger 1, the tool hanger 1 of the present disclosure can be easily horizontally moved and stably positioned on the two hooks 30 fixed on the wall by allowing any two of the positioning grooves 22 to correspond to and engage with the two hooks 30 fixed on the wall W.

The invention claimed is:

1. A tool hanger comprising:

a main body having an upper portion and a lower portion opposite to the upper portion, the upper portion of the main body being provided with a hanging hole, the hanging hole having a top wall and a plurality of positioning grooves provided in the top wall for engaging with at least one hook; the lower portion of the main body being provided with a tool hanging part for hanging at least one tool;

wherein the hanging hole further has a bottom wall opposite to the top wall and a slot extending horizontally between the top wall and the bottom wall, and wherein each of the positioning grooves is recessed inward from the top wall and communicates with the slot;

wherein all of the positioning recesses are formed to have an identical depth;

wherein the upper portion of the main body is further provided with a flange surrounding the hanging hole;

wherein the upper portion of the main body has a hanging portion and a hollow portion formed below the hanging portion, wherein the hanging portion includes a top plate, a partition arranged between the top plate and the hollow portion, and a connecting plate connecting between the top plate and the partition, wherein the top plate and the partition together define a grip portion, and wherein the hanging hole penetrates through the connecting plate;

wherein the partition is disposed between the flange and the hollow portion to separate the hanging hole from the hollow portion;

wherein the hollow portion is configured to be reached into by a user's fingers for grasping the grip portion.

2. The tool hanger as claimed in claim 1, wherein each of the positioning grooves is continuously arranged along the extension direction of the slot.

3. The tool hanger as claimed in claim 1, wherein each of the positioning grooves has an arc-shaped abutting surface.

* * * * *